US009197115B2

(12) United States Patent
Kubes et al.

(10) Patent No.: US 9,197,115 B2
(45) Date of Patent: Nov. 24, 2015

(54) ELECTRIC MACHINE COOLING (71) Applicant: REMY TECHNOLOGIES, LLC, Pendleton, IN (US)

(72) Inventors: Larry Kubes, Indianapolis, IN (US); Thomas Bockelmann, Knightstown, IN (US); Csaba Vari, Pendleton, IN (US)

(73) Assignee: REMY TECHNOLOGIES, LLC, Pendleton, IN (US)

( * ) Notice: Subject to any disclaimer, the term of this patent is extended or adjusted under 35 U.S.C. 154(b) by 276 days.

(21) Appl. No.: 13/751,649

(22) Filed: Jan. 28, 2013

(65) Prior Publication Data
US 2013/0214624 A1  Aug. 22, 2013

Related U.S. Application Data (60) Provisional application No. 61/591,799, filed on Jan. 27, 2012.

(51) Int. Cl.
| H02K 9/00 | (2006.01) |
| H02K 9/193 | (2006.01) |
| H02K 5/20 | (2006.01) |
| H02K 9/19 | (2006.01) |
| H02K 9/06 | (2006.01) |

(52) U.S. Cl.
CPC ............... *H02K 9/193* (2013.01); *H02K 5/20* (2013.01); *H02K 9/19* (2013.01); *H02K 9/06* (2013.01)

(58) Field of Classification Search
CPC ............ H02K 9/06; H02K 9/16; H02K 9/193
USPC .......................... 310/52, 54, 58, 64, 60 A, 59
See application file for complete search history.

(56) References Cited

U.S. PATENT DOCUMENTS

| 4,725,198 A | * | 2/1988 | Fraser | 415/110 |
| 5,939,808 A | * | 8/1999 | Adames | 310/89 |

(Continued)

FOREIGN PATENT DOCUMENTS

| JP | 10336968 A | 12/1998 |
| JP | 1141862 A | 2/1999 |

(Continued)

OTHER PUBLICATIONS

KIPO Search Report and Written Opinion dated May 15, 2013 for corresponding Application No. PCT/US2013/023463.

*Primary Examiner* — Hanh Nguyen
(74) *Attorney, Agent, or Firm* — Greenberg Traurig LLP (57) ABSTRACT

Embodiments of the invention provide an electric machine module including an electric machine. The electric machine includes a rotor and a stator assembly, and an output shaft having a longitudinal axis that is circumscribed by a portion of the rotor. The output shaft may comprise an output shaft channel and the rotor may include a rotor channel, and the rotor and the output shaft channels may be in fluid communication. The machine further includes a coolant jacket at least partially within a sleeve member that circumscribes at least a portion of the stator assembly, and at least one pump mounted generally concentrically with respect to the output shaft, that is in fluid communication with the coolant jacket. Some embodiments of the electric machine module include coupling to a fluid system that is configured and arranged to transport fluid, such as the coolant, throughout the fluid system.

15 Claims, 6 Drawing Sheets

(56) References Cited

U.S. PATENT DOCUMENTS

| | | | |
|---|---|---|---|
| 8,161,643 B2 * | 4/2012 | Smith et al. | 29/890.03 |
| 8,491,277 B2 * | 7/2013 | Kawabata et al. | 417/368 |
| 2007/0278869 A1 * | 12/2007 | Taketsuna | 310/54 |
| 2009/0121562 A1 * | 5/2009 | Yim | 310/54 |
| 2011/0298315 A1 | 12/2011 | Fulton | |
| 2011/0309698 A1 * | 12/2011 | Kirkley et al. | 310/54 |

FOREIGN PATENT DOCUMENTS

| | | |
|---|---|---|
| JP | 2001008413 A | 1/2001 |
| JP | 2008026213 A | 9/2008 |

* cited by examiner

ELECTRIC MACHINE COOLING

BACKGROUND

Some electric machines include a stator assembly and a rotor and are housed within a machine cavity. During operation of electric machines, a considerable amount of heat energy can by generated by both the stator and the rotor, as well as other components of the electric machine. As power output from electric machines continues to increase, there is a need to remove heat from the machine to maintain long-life and ensure reliability. Some electric machines are cooled by circulating a coolant through portions of the machine cavity. For example, the coolant can contact the rotor at a generally low tangential speed and then can be accelerated by a combination of friction with the rotor and radial movement further from a center line of rotation of the rotor. Conventional cooling methods can include removing the generated heat energy by circulating a coolant through inner walls of the housing or dispersing a coolant throughout the machine cavity of the housing.

SUMMARY

Some embodiments of the invention provide an electric machine module including an electric machine. The electric machine can include a rotor and an output shaft. The output shaft can include a longitudinal axis that can be at least partially circumscribed by the rotor. In some embodiments, the output shaft comprises an output shaft channel that can be coupled to the rotor. In some embodiments, a coolant passage system can be positioned within the rotor, and can include an inlet channel in fluid communication with the output shaft channel. In some embodiments, the coolant passage system can include at least one chamber.

Some embodiments of the invention provide an electric machine module, which can include a housing. In some embodiments, the housing can define at least a portion of a machine cavity. In some embodiments, an electric machine can be positioned within the machine cavity, and at least partially enclosed by the housing. In some embodiments, the electric machine can include a rotor that can substantially radially oppose a stator assembly. In some embodiments, the rotor can include a rotor hub, which can include at least an inner diameter. In some embodiments, the rotor hub can also comprise an inlet channel in fluid communication with a coolant inlet, which can be in fluid communication with the machine cavity. The rotor hub can include at least one recess in fluid communication with the inlet channel and an outlet channel. In some embodiments, the outlet channel can be in fluid communication with a coolant outlet, which can be in fluid communication with the machine cavity. In some embodiments, the module can comprise an output shaft that can include a longitudinal axis and to which the rotor hub can be coupled.

In some embodiments the electric machine can include a coolant jacket containing a coolant substantially circumscribing, or at least partially surrounding the stator. In some embodiments, coolant apertures can fluidly connect the coolant jacket to other components within the housing of the electric machine. Some embodiments comprise a coolant jacket that can be in fluid communication with a coolant source.

Some embodiments of the invention include at least one pump to aid in coolant influx, efflux, and/or circulation through portions of the electric machine. Some embodiments of the invention utilize multiple pump configurations. The pump can comprise a gerotor-style pump, a gear-type pump, a vane-type pump, or any other conventional pump. The pump can be generally concentrically positioned with respect to the rotor hub and/or the output shaft, and be positioned substantially within the housing of the electric machine, or immediately outside of the housing, substantially fluidly coupled to at least one component inside the housing.

In some embodiments, the movement of the electric machine can lead to coolant circulation by the pump. For example, in some embodiments, the pump can be coupled to the rotor hub and/or the output shaft, as the rotor hub, and the movement created by these components can drive operation of the pump. Furthermore, the pump can be fluidly coupled to various elements of the electric machine, and can draw some of the coolant from a coolant sump, or external sources, or both.

Some embodiments of the invention include a fluid system comprising of the electric module and at least one or more other electric machine modules. In some embodiments, the fluid system can comprise one or more power sources, one or more heat exchange elements, one or more reservoirs, and a plurality of fluid lines that are configured and arranged to transport fluid, such as the coolant, throughout the fluid system.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives that fall within the scope of embodiments of the invention.

Figure 1:
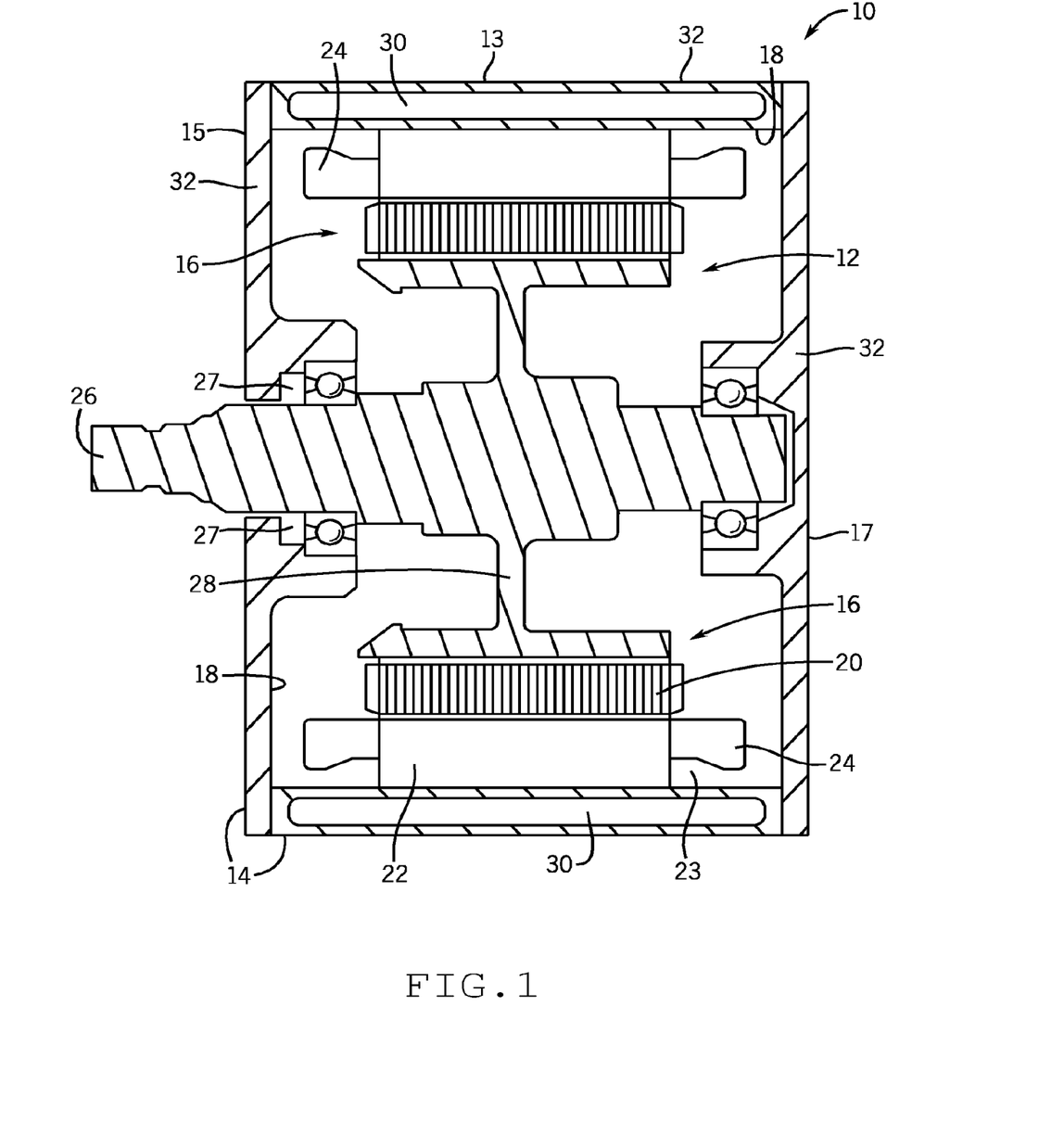
FIG. 1 is a cross-sectional view of an electric machine module according to one embodiment of the invention.

FIG. 1 illustrates an electric machine module 10 according to one embodiment of the invention. The electric machine module 10 can include an electric machine 12 and a housing 14. The electric machine 12 can be disposed within a machine cavity 16 defined at least partially by an inner wall 18 of the housing 14. The electric machine 12 can include a rotor 20, a stator 22, and stator end turns 24, and bearings 27. The electric machine 12 can be disposed about an output shaft 26. In some embodiments, the electric machine 12 also can include a rotor hub 28 (as shown in FIG. 1), or can have a "hub-less" design (not shown). In some embodiments, the rotor hub 28 can be coupled to the output shaft 26 so that at least a portion of torque generated by the operation of the electric machine 12 can transfer from the rotor hub 28 to the output shaft 26. As described further below in reference to FIG. 6, in some embodiments, the torque can be transferred to remote locations via the output shaft 26.

In some embodiments, the housing 14 can comprise a sleeve member 13, a first end cap 15, and a second end cap 17. For example, the sleeve member 13 and the end caps 15, 17 can be coupled via conventional fasteners (not shown), or another suitable coupling method, to enclose at least a portion of the electric machine 12 within the machine cavity 16. In some embodiments, the housing can comprise a substantially cylindrical canister and a single end cap (not shown). In some embodiments, the housing 14, including the sleeve member 13 and the end caps 15, 17, can comprise materials that can generally include thermally conductive properties, such as, but not limited to aluminum or other metals and materials capable of generally withstanding operating temperatures of the electric machine while serving as good conductors of thermal energy. In some embodiments, the housing 14 can be fabricated using different methods including casting, molding, extruding, and other similar manufacturing methods.

The electric machine 12 can be, without limitation, an electric motor, such as a hybrid electric motor, an electric generator, or a vehicle alternator. In one embodiment, the electric machine can be a High Voltage Hairpin (HVH) electric motor for use in a hybrid vehicle.

During normal operation of the electric machine 12, significant heat can be generated by one or more components as described, including, but not limited to, the rotor 20, the stator assembly 23, and the stator end turns 24. One or more of these components can be cooled to increase the performance and the lifespan of the electric machine 12.

In some embodiments, as shown in FIG. 1, the housing 14 can include a coolant jacket 30. The coolant jacket 30 can substantially circumscribe or at least partially surround the stator 22 and can be configured and arranged to contain a coolant. The coolant can be ethylene glycol, propylene glycol, water, a mixture of water and either ethylene glycol or propylene glycol, different oils, including motor oil, transmission oil, or any other similar substance. In some embodiments, coolant apertures (not shown) can fluidly connect the coolant jacket 30 with the machine cavity 16 so that a portion of the coolant circulating through the coolant jacket 30 can disperse into the machine cavity 16. Also, in some embodiments, the coolant jacket 30 can be in fluid communication with a coolant source (not shown) which can pressurize the coolant prior to or as it is being dispersed into the coolant jacket 30, so that the pressurized first coolant can circulate through the coolant jacket 30 and some of the coolant can exit the coolant jacket 30 through the coolant apertures. In some embodiments, the coolant apertures can be positioned substantially radially outward from the stator end turns 24 so that some of the coolant exiting the coolant apertures can be directed toward the stator end turns 24 to at least partially wet the stator end turns 24 with liquid coolant. In some embodiments, a wetting of the stator end turns 24 with liquid coolant at least partially cools the end turns 24. In some embodiments, the inherent fluid mobility of the liquid coolant on the end turns at least partially transfer heat away from the end turns 24.

In some embodiments, a second portion of the coolant can originate from a substantially radially inward position of the module 10. In some embodiments, the output shaft 26 can include an output shaft coolant channel (not shown) and the rotor hub 28 can include a rotor hub coolant channel (not shown) in fluid communication with the machine cavity 16. In some embodiments, the rotor hub coolant channel can be in fluid communication with the output shaft coolant channel. For example, in some embodiments, the second portion of the coolant can circulate through the output shaft coolant channel, flow through the rotor hub coolant channel, and then can disperse into the machine cavity 16 where it can contact some of the elements of the module 10 to aid in cooling. Furthermore, any coolant exiting any one or more rotor hub coolant channels, or any one or more output shaft coolant channels, may, following travel within the machine cavity 16, enter the coolant jacket 30 through any one or more coolant apertures. Conversely in some embodiments, any coolant exiting the coolant jacket 30 through any one or more coolant apertures, can travel within the machine cavity 16, and subsequently enter one or more rotor hub coolant channels, or any one or more output shaft coolant channels. Moreover, in some embodiments, as the coolant circulates, it can receive at least a portion of the heat energy produced by any other portions of the rotor 20. For example, in some embodiments, the output shaft 26 can include at least one output shaft channel and at least one output shaft coolant outlet so that the coolant can flow through the channel and at least a portion of the coolant can exit the output shaft channel. In some embodiments, the output shaft coolant outlet can comprise a plurality of output shaft coolant outlets (not shown). Furthermore, in some embodiments, more than one output shaft coolant outlet can be included (not shown). Also, in some embodiments, output shaft coolant outlets can be positioned along the axial length of the output shaft 26 so that the coolant can be dispersed to different areas of the module 10 and machine cavity 16, including the bearings 27. In some embodiments, the output shaft coolant channels can comprise both axially oriented and radially oriented sections, (not shown), so that the module 10 can function without the output shaft coolant outlet. Moreover, in some embodiments, some modules 10 can be configured and arranged with outlets in different locations so that coolant flow rates can be varied.

Figure 2:
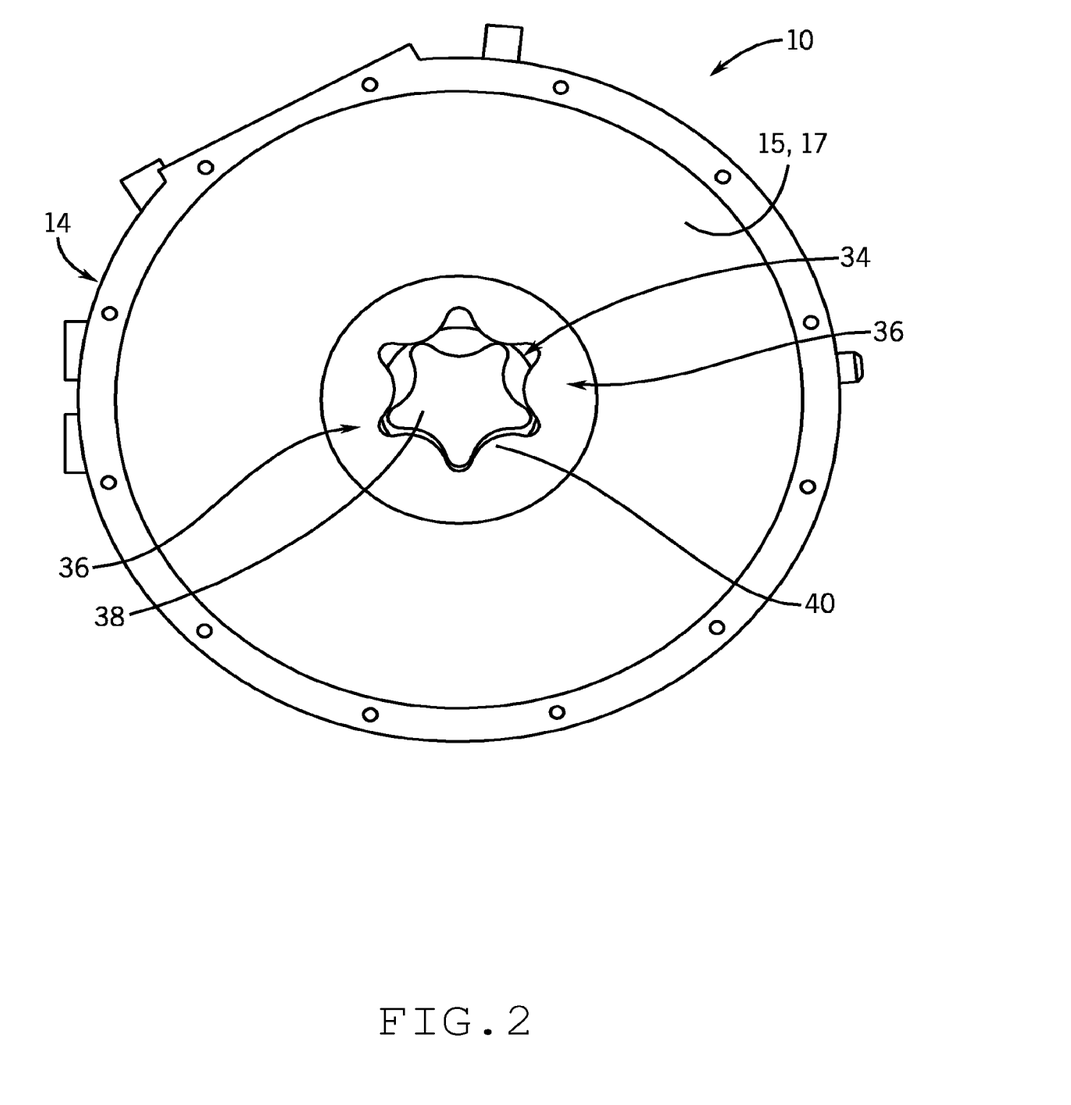
FIG. 2 is a side view of a portion of an electric machine module according to one embodiment of the invention.

According to some embodiments of the invention, the module 10 can comprise at least one pump 34 to aid in coolant influx, efflux, and/or circulation through portions of the module 10. In some embodiments, the pump 34 can comprise a gerotor-style pump, a gear-type pump, a vane-type pump, or other any other conventional pumps. According to some embodiments of the invention, the pump 34 can employ the motive energy transferred by the rotor hub 28 and/or the output shaft 26 to aid in circulating the coolant. For example, in some embodiments, the pump 34 can comprise a positive displacement type pump, such as a gerotor-style pump, as shown in FIG. 2, although as previously mentioned, in other embodiments, the pump 34 can comprise other types of pumps. In some embodiments the pump 34 can be generally concentrically positioned with respect to the rotor hub 28, and/or the output shaft 26. For example, in some embodiments, the pump 34, the rotor hub 28, and/or the output shaft 26 can be coupled together so that movement of the rotor hub 28 and/or output shaft 26 can at least partially supply any movement necessary to operate the pump 34. As used herein, "generally concentric" means at least one rotating element of one component rotates about an axis that is generally aligned, but not necessarily completely aligned, with an axis of rotation of another component. In some embodiments, "generally concentric," components can be aligned enough for effective rotational power transmission.

In some embodiments that comprise a gerotor-style pump, the pump can comprise an inner rotor 38 that may generally comprise a trochoidal inner rotor with external teeth, and an outer rotor 40 formed with intersecting circular arcs with teeth meshing with the external teeth of the inner rotor 38. As shown in FIG. 2, the inner rotor 38 has 5 'teeth' and the outer rotor 40 has 6 'teeth'. In alternative embodiments of the invention, the number of inner rotor 38 teeth and outer rotor 40 teeth may be smaller or larger. In some embodiments, the relationship between the inner rotor teeth and outer rotor follows a rule in which the inner rotor has N teeth, the outer rotor has N+1 teeth.

In some embodiments, the inner rotor 38 can be coupled to the rotor hub 28 and/or the output shaft 26, and the outer rotor 40 can be coupled to at least one the end caps 15, 17 (i.e., either the inner wall 18 or the outer wall 32), or other locations proximal to the module 10, as previously mentioned. For example, in some embodiments, the inner rotor 38 can be coupled to elements of the module 10 so that the inner rotor 38 is generally concentric with the rotor hub 28, and/or the output shaft 26, and the outer rotor 40 is generally concentric with the inner rotor 38 (e.g., the outer rotor 40 is generally radially outward relative to at least a portion of the inner rotor 38). In some embodiments, the rotor hub 28, and/or output shaft 26 can move during operation of the electric machine 12. This can lead to movement of the inner rotor 38, and the interaction of the inner rotor 38 and the outer rotor 40 can create both a suction force and a pressure force in the pump 34, which can be transferred to at least a portion of the coolant in contact or adjacent to the pump 34. As a result, in some embodiments, the pump 34 can aid in circulation of the coolant through the module 10.

In some embodiments of the invention, the module 10 can employ multiple pump configurations. In some embodiments, pumps 34 of more than one style can be employed to enhance coolant circulation (e.g. two different styles of pump in one end cap or two different styles of pump in each of the end caps 15, 17). For example, in some embodiments, a first pump 34 can be coupled to either or both of the end caps 15, 17 and can be configured to circulate oil from a remote location to the coolant jacket 30, and/or the output shaft, and rotor hub coolant channels (not shown). Further, in some embodiments, a second pump 34 can be coupled to either the same end cap 15, 17 as the first pump, or can be coupled to the other end cap 15, 17. In some embodiments, the second pump can be configured to transport a portion of the coolant to a remote location after the coolant flows through portions of the module 10. For example, in some embodiments, the first pump can draw the coolant from a remote location, which can lead to a portion of the coolant dispersing into the machine cavity 16 to aid in cooling the machine 12. Then, in some embodiments, after the coolant flows toward the bottom of the housing 14, the second pump can direct the coolant either back to the same remote location, or a different location. Moreover, either the first pump and/or the second pump can circulate a portion of the coolant through the module 10 more than one time before circulating it out of the module 10.

Figure 4:
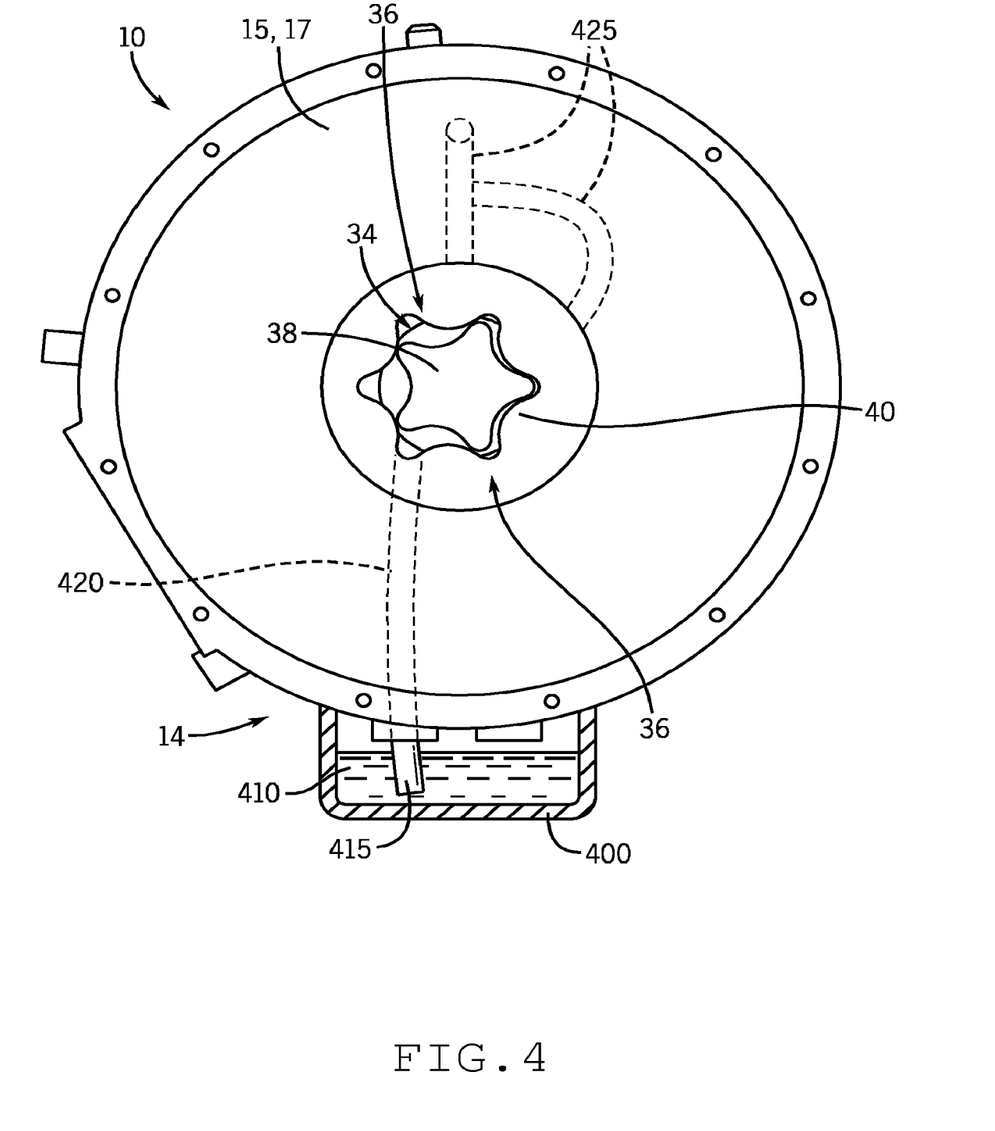
FIG. 4 is a side view of a portion of an electric machine module according to one embodiment of the invention.
Figure 5:
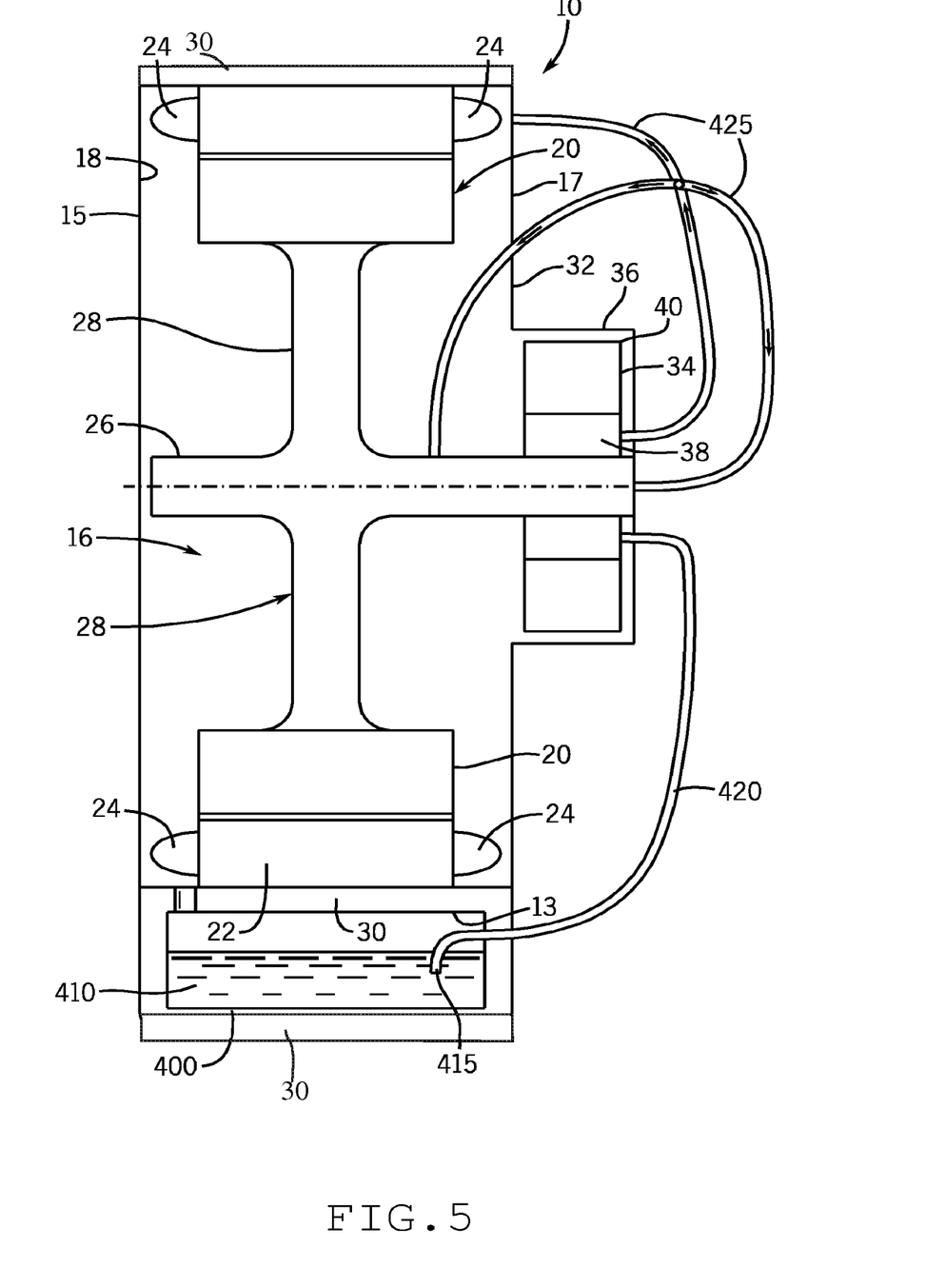
FIG. 5 is a cross-sectional view of the electric machine module of FIG. 4.

In some embodiments, the pump 34 can at least partially drive coolant flow when the electric machine 12 is substantially not in operation. In some embodiments, for a period of time after the electric machine 12 substantially ceases operating, cooling can continue to be beneficial for the module 10. In some embodiments, a conventional accumulator (not shown) can be coupled to the module 10, the fluid circulatory system, and/or the pump 34. In some embodiments, the accumulator can comprise a reservoir including a spring diaphragm, an air diaphragm, or another similar diaphragm-like or reservoir structure. In some embodiments, the accumulator can fluidly connect to the pump 34 via the fluid circulatory system (for example as shown in FIG. 4 and FIG. 5 as 400, 415, 420, and 425), so that at least a portion of the coolant that the pump 34 circulates flows into the accumulator. For example, in some embodiments, the pump can circulate the coolant so that the coolant entering the accumulator can compress the diaphragm-like structure. As a result, when the diaphragm-like structure is not under pressure created by the pump 34 (e.g., when the module 10 is not in operation), the accumulator can direct at least a portion of the coolant to circulate through the coolant jacket 30, the output shaft coolant channel, and/or the rotor hub coolant channel, which can lead to further cooling even though the pump 34 is substantially not in operation.

Figure 3:
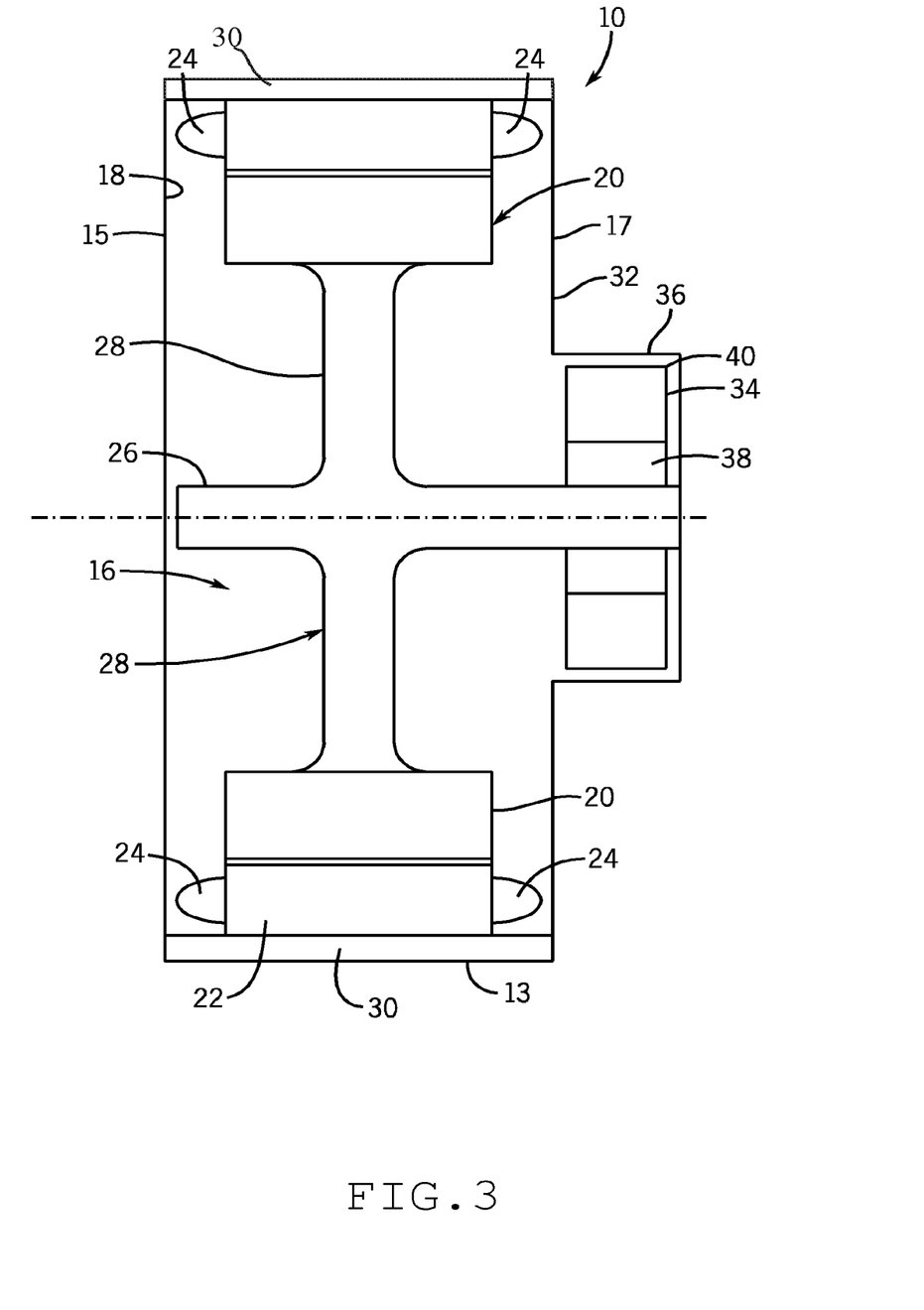
FIG. 3 is a cross-sectional view of the electric machine module of FIG. 2.

In some embodiments, the pump 34 can be coupled to and/or positioned within either one of or both of the end caps 15, 17. In some embodiments, the pump 34 can be generally positioned along the inner wall 18 of the end caps 15, 17, and in some other embodiments, the pump 34 can be positioned elsewhere in the machine cavity 16. In some embodiments, the pump 34 can be positioned substantially outside of the machine cavity 16, as shown in FIGS. 2 and 3. For example, in some embodiments, the pump 34 can be coupled to an outside wall 32 of the end caps 15, 17, or other portions of the housing 14. For example, in some embodiments, the pump 34 can be coupled to the outside wall 32 substantially within a sealed structure 36. As shown in FIG. 3, in some embodiments, at least one of the end caps 15, 17 can comprise the sealed structure 36 as a substantially integral element (e.g., at least one of the end caps 15, 17 is formed with the sealed structure 36). In other embodiments, the sealed structure 36 is coupled to at least one of the end caps 15, 17 via any conventional coupling methods so that the sealed structure 36 is substantially impermeable to any coolant flowing out of the machine cavity 16.

As shown in FIG. 4 and FIG. 5, in some embodiments of the invention, the coolant can flow through a substantially sealed system. In some further embodiments, the sealed structure 36 can be in fluid communication with the machine cavity 16 and a fluid circulatory system (shown in FIG. 4 and FIG. 5 as 400, 415, 420 and 425), so that the pump 34 can aid in circulating the coolant. For example, in some embodiments, the fluid circulatory system can include a sump 400, a coolant scavenge line 420 via a first end of the scavenge line 415, at least partially submerged in a coolant 410, and coolant delivery lines 425 able to deliver high pressure coolant to at least one component in the machine cavity 16.

Further, in some embodiments, the coolant passage system 425 and 420 can comprise other configurations. As shown in FIG. 4 and FIG. 5, in some embodiments, the coolant passage system can function without at least some of the output shaft coolant channels and rotor coolant outlets. For example, in some embodiments, the coolant passage system can comprise an inlet coolant scavenge line 420 with a first end of the scavenge line 415 fluidly coupled with a coolant sump. In some embodiments, the inlet coolant scavenge line 420 can fluidly connect the machine cavity 16 via the pump 34 and with at least some of the pressurized coolant lines 425. Moreover, in some embodiments, multiple inlet coolant scavenge lines 420 can fluidly connect multiple inlet channels 425 to the machine cavity 16 via the pump 34. In some embodiments, the multiple inlet channels 425 can be configured to receive coolant from the machine cavity 16 so that the coolant can enter an output line (not shown), and then flow through coolant sump 400, and the inlet coolant scavenge line 420, and then re-enter the machine cavity 16 via the pump 34, and pressurized coolant lines 425.

Figure 6:
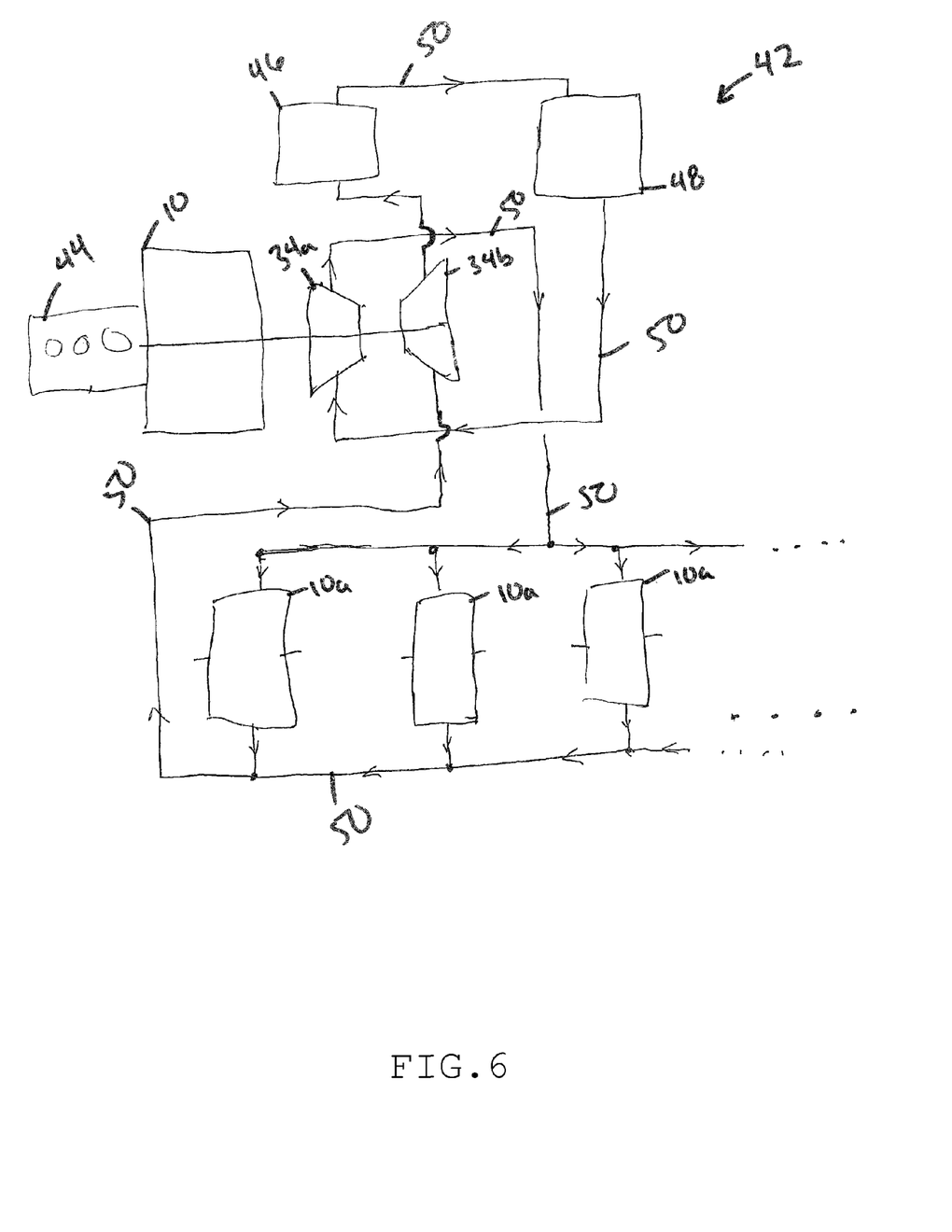
FIG. 6 is a diagram of a fluid system according to one embodiment of the invention

In some embodiments, the pump 34 can fluidly couple, via the fluid circulatory system 400, 415, 420 and 425, to the coolant jacket 30, an output shaft coolant channel, a rotor hub coolant channel, a coolant sump 400 positioned substantially at or near a bottom of the housing 14, and/or other locations remote to the module 10 (for example, to at least some portion of the system 42 illustrated in FIG. 6). For example, in some embodiments, because the pump 34 can be coupled to the rotor hub 28 and/or the output shaft 26, as the rotor hub 28 and the output shaft 26 move during operation, the movement created by the electric machine 12 can drive operation of the pump 34. As a result, the pump 34, fluidly coupled to various elements of the module 10 via the fluid circulatory system, can aid in circulating at least a portion of the coolant 410 through the coolant jacket 30 and/or through the output shaft and rotor hub coolant channels. Moreover, in some embodiments, the pump 34 can draw some of the coolant 410 from the coolant sump 400 and circulate it through the coolant jacket 30, and the other coolant channels. Also, in some embodiments, the pump 34 can draw coolant from sources external to the module 10 (for example from at least some portion of the system 42 illustrated in FIG. 6), in addition to, or in place of drawing coolant from the coolant sump 400.

Additionally, in some embodiments, the pump 34 also can scavenge a portion of the coolant after it enters the machine cavity 16. For example, in some embodiments, after the coolant enters the machine cavity 16 and flows over a portion of the module 10 elements, a portion of the coolant can either enter the fluid circulatory system through at least one drain (not shown) positioned near the bottom of the housing 14, or can enter the coolant sump at or near the bottom of the housing 14. In some embodiments, the pump 34 (e.g. via pump 34 operations driven by machine 12 operations) can circulate a portion of the coolant from the drain and/or the coolant sump 400, to either the coolant jacket 30, and/or conventional coolant channels having at least portions of the channels substantially centered in the output shaft 26 and rotor hub 28 (not shown). In some embodiments, the pump 34 can also circulate a portion of the coolant from the drain and/or the coolant sump, to a heat-exchange element (46 in FIG. 6), and some of the heat energy transferred to the coolant from the module 10 can be removed, and the coolant can be recirculated.

In some embodiments, the pump 34 can fluidly connect, via the fluid circulatory system to the coolant jacket 30, and function without the presence of an output shaft coolant channel, a rotor hub coolant channel, or both. For example, in some embodiments, because the pump 34 can be coupled to the rotor hub 28 and/or the output shaft 26, as the rotor hub 28 and the output shaft 26 move during operation, the movement created by the electric machine 12 can drive operation of the pump 34. As a result, the pump 34, fluidly coupled to various elements of the module 10 via the fluid circulatory system, can aid in circulating at least a portion of the coolant through the coolant jacket 30. For example, in some embodiments, coolant fluid from the coolant sump 400, the pump 34 (e.g. via pump 34 operations driven by machine 12 operations), can circulate a portion of the coolant to the coolant jacket 30. During this operation, coolant fluid moves into the machine cavity and can absorb thermal energy from at least one component in the machine cavity, including, but not limited to the rotor hub 28, the stator and the stator end turns. As a result, in general, coolant fluid initially entering the machine cavity via the pump 34 will be at a lower temperature upon first entering the machine cavity 16, than when it enters the coolant jacket 30.

In some embodiments, the pump 34 also can circulate a portion of the coolant from the drain and/or the coolant sump to a remote location, where some of the coolant can enter a heat-exchange element (shown as 46 in FIG. 6), and some of the heat energy transferred to the coolant from the module 10 can be removed, and the coolant can be recirculated. Moreover, in some embodiments, the pump 34 can draw some of the coolant from the coolant sump 400 and circulate it through the coolant jacket 30. Also, in some embodiments, the pump 34 can draw coolant from sources external to the module 10 (the system 42 in FIG. 6 for example), in addition to, or in place of drawing coolant from the coolant sump 400.

In some embodiments, some of the previously mentioned pump configurations can be beneficial relative to configurations using a generally external pump configuration. In some embodiments, because external pumps may not be required and coolant can be pumped and/or scavenged by the pumps 34, the general size of the module 10 can be reduced as can the cost of production. In some embodiments, the space into which the module 10 can be installed in downstream applications can be reduced because no external pumps are needed to accompany the module 10.

In some embodiments, some of the previously mentioned pump configurations can be beneficial relative to configurations using a generally external pump configuration. In some embodiments, because external pumps may not be required and coolant can be pumped and/or scavenged by the pumps 34, the overall size of the module 10 can be reduced as can the cost and labor associated with production. In some embodiments, the space into which the module 10 can be installed in downstream applications can be reduced because no external pumps would be needed to accompany the module 10. Further, in some embodiments, the cost and labor of producing the module 10 can be reduced because the need for external pumps can be either generally reduced or eliminated.

As shown in FIG. 6, in some embodiments, a fluid system 42 can comprise one or more of the electric machine modules 10. For example, the fluid system 42 can comprise one or more power sources 44 (e.g., an internal combustion engine, an electric motor, or other apparatuses configured and arranged to produce power), a heat exchange element 46, one or more reservoirs 48, and a plurality of fluid lines 50 (e.g., fluid hoses) that are configured and arranged to transport fluid, such as the coolant, throughout the fluid system 42.

In some embodiments, at least one of the electric machine modules 10 can be operatively coupled to the power source 44. For example, the output shaft 26 can be coupled to a portion of the power source 44 so that at least a portion of the movement of the power source 44 can be translated to movement of the shaft 26. Moreover, as previously mentioned, in some embodiments, one or more pumps 34 can be coupled to the shaft 26 so that movement of the shaft 26 can at least partially drive movement and operations of the pumps 34.

In some embodiments, operation of the pumps 34 can at least partially cause flow of coolant through at least some portions of the fluid system 42. For example, the module 10 coupled to the power source 44 can comprise one or more pumps 34 (e.g., one pump 34 comprise more than one stage to provide pumping and scavenging functionalities, more than one pump 34 with each pump 34 separately providing pumping and scavenging functionalities, more than one pump 34 with each pump 34 providing pumping and scavenging functionalities, etc.) that are configured and arranged to distribute coolant through at least some portions of the fluid system 42. As shown in FIG. 6, in some embodiments, the module 10 can comprise at least two pumps 34, a first pump 34a configured and arranged to pump coolant and a second pump 34b configured and arranged to scavenge coolant. However, as previously mentioned, the two-pump configuration is only intended as an example, and other numbers of pumps with multiple functionalities can be used.

As shown in FIG. 6, in some embodiments, one or more fluid lines 50 can be in fluid communication with the pumps 34a,34b. The fluid lines 50 can be coupled to at least a portion of the housing 14 so that coolant can move through the system 42 and the module 10. In some embodiments, the fluid system 42 can comprise one or more remote modules 10a distributed throughout some portions of the structure into which the fluid system 42 in installed. For example, in some embodiments, the fluid system 42 can be installed in a vehicle and at least some of the remote modules 10a can be operatively coupled to wheels of the vehicle (e.g., to provide some or all of the motive force driving the vehicle). In other embodiments, the remote modules 10a can be operatively coupled to other elements of the vehicle, as desired by the manufacturer or user. Furthermore, although the fluid system 42 depicted in FIG. 6 includes three remote modules 10a, other embodiments of the invention can include more or fewer than three remote modules 10a.

As reflected by the arrows in FIG. 6, the fluid lines 50 can function to guide coolant between and among the modules 10, 10a in addition to other elements of the fluid system 42. For example, at least one of the fluid lines 50 can fluidly connect at least one of the pumps 34a and the reservoir 48. As a result, when the pump 34a is activated (e.g., the shaft 26 is moving so that the pump 34a is moving coolant), the pump 34a can draw coolant from the reservoir 48 and distribute at least a portion of the coolant to the remote modules 10a via the fluid lines 50, as reflected by the arrows in FIG. 6. In some embodiments, once reaching some or all of the remote modules 10a, the coolant can flow through the remote modules 10a in a manner similar to some previously described embodiments to provide cooling and/or lubrication to at least some of the elements of the remote modules 10a. As a result of the cooling and/or lubricating benefits provided by at least some portions of the coolant flowing through at least some of the remote modules 10a, operations of the modules 10a can be at least partially enhanced because of the reductions in operating temperature and friction provided by the circulating coolant. Moreover, as previously mentioned, the pump 34a can also distribute at least a portion of the coolant to the machine cavity 16 to cool and/or lubricate at least some of the components of the module 10, which can also provide operational benefits. Additionally, in some embodiments, one or more of the remote modules 10a can comprise one or more pumps (not shown) to assist in the flow of fluid through the fluid lines 50.

In some embodiments, coolant flow can be further mediated by one or more pumps 34b functioning in a scavenging capacity. As shown in FIG. 6, at least one of the pumps 34b can be configured and arranged to comprise a scavenging functionality to draw at least a portion of the coolant flowing through the fluid lines 50 back to the module 10. Moreover, as shown in FIG. 6, the pump 34b can be fluidly connected to the heat exchange element 46 via one or more fluid lines 50. In some embodiments, the pump 34b can move at least a portion of the coolant from the remote modules 10a to the heat exchange element 46 so that at least a portion of the heat received by the coolant as it passes through the remotes modules 10a can be removed and the coolant can be re-circulated through the fluid system 42. Moreover, the pump 34b can further force the coolant from the heat exchange element 46 to the reservoir 48, where the coolant can be re-circulated and/or stored for later use in cooling and/or lubricating. Further, although depicted in fluid communication with the pump 34b in FIG. 6, the heat exchange element 46 can be in fluid communication with any and/or all pumps 34a,34b (or other pumps not shown) of the fluid system 42.

Additionally, in some embodiments, the reservoir 48 can be configured and arranged to de-aerate the coolant. For example, as coolant circulates through the modules 10, 10a and/or the heat exchange element 46, a volume of air can be introduced into at least a portion of the coolant. The reservoir 48 can be configured and arranged to remove at least some of the air introduced using conventional structures such as screens and compartments. In some embodiments, aerated coolant can comprise reduced cooling and lubrication efficiencies. Accordingly, removal of some or all of the air introduced into the coolant can improve cooling and lubrication.

Additionally, in some embodiments, the reservoir 48 can be configured and arranged to filter the coolant. For example, as coolant circulates through the modules 10, 10a and/or the heat exchange element 46, particles of contaminant can be introduced into at least a portion of the coolant. In some embodiments, the reservoir 48 (or some other component of the system 42) can be configured and arranged to remove at least some contaminant. For example, in some embodiments, the reservoir 48 (or some other component of the system 42) can comprise a contaminant filter configured and arranged to trap at least some contaminant. In some embodiments, a filtered coolant can improve cooling and lubrication. In some embodiments, the contaminant filter can comprise a replaceable filter.

In some embodiments, the fluid system 42 can comprise one or more regulatory elements to at least partially provide control for fluid flow through the system 42. For example, in some embodiments, the fluid system 42 can comprise one or more restrictors and/or valves (not shown) in fluid communication with the modules 10, 10a, the reservoir 48, the heat exchange element 46, and/or at least some of the fluid lines 50 so that these regulatory elements can at least partially control fluid flow. Moreover, in some embodiments, at least a portion of the current-using components of the fluid system 42 (e.g., the electric machine module 10, the remote electric machine modules 10a, etc.) can be in communication with a control module (not shown) that can use methods of current regulation, such as pulse-width modulation, to control the rate of operation of at least some of the pumps 34a,34b.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

The invention claimed is:

1. An electric machine module for a vehicle comprising:
    a housing defining a machine cavity and comprising a first end cap, a second end cap and a sleeve member;
    an electric machine positioned within the machine cavity and at least partially enclosed by the housing, the electric machine comprising a rotor, the rotor including a rotor hub and a stator assembly, the stator assembly comprising stator end turns, wherein the stator assembly circumscribes at least a portion of the rotor;
    an output shaft having at least a portion coupled to the rotor;
    a coolant jacket circumscribing at least a portion of the stator assembly, wherein the sleeve member forms at least one side of the coolant jacket; and
    wherein the coolant jacket is configured and arranged to house a liquid coolant; and
    at least one pump fluidly coupled to the coolant jacket, and configured and arranged to be fluidly coupled to at least one other remote module,
    the other remote module coupled to other elements of the vehicle,
    the at least one pump mounted generally concentrically with respect to the output shaft, and
    the at least one pump configured and arranged to circulate liquid coolant between the coolant jacket, the rotor, the stator assembly, and at least one other component of the electric machine and the at least one other remote module.

2. The electric machine module of claim 1, wherein the coolant jacket is further configured and arranged to enable the liquid coolant to flow within the coolant jacket to at least one component within the electric machine or to the remote module fluidly coupled to the electric machine.

3. The electric machine module of claim 2, wherein the coolant jacket circumscribes the stator assembly.

4. The electric machine module of claim 1 wherein the liquid coolant comprises at least one of ethylene glycol, propylene glycol, water, a mixture of water and either ethylene glycol, a mixture of water and propylene glycol, a hydrocarbon, and an oil.

5. The electric machine module of claim 1, wherein the pump comprises at least one of a gerotor-type pump, a gear-type pump, a vane-type pump, and a displacement-type pump.

6. The electric machine module of claim 1 wherein the at least one pump is positioned within the housing and fluidly coupled to at least one component inside the housing.

7. The electric machine module of claim 1 wherein the at least one pump is positioned immediately outside of the housing and fluidly coupled to at least one component inside the housing.

8. The electric machine module of claim 1, wherein the at least one pump is coupled to and positioned within an end cap.

9. The electric machine module of claim 1, wherein the at least one pump comprises two or more pumps.

10. The electric machine module of claim 9, wherein the two or more pumps includes a scavenge pump.

11. The electric machine module of claim 1, wherein the at least one remote module is fluidly coupled to the electric machine module and a fluidic system.

12. The electric machine module of claim 11, wherein the at least one pump is configured and arranged to distribute a liquid coolant from the electric machine module to the fluidic system.

13. The electric machine module of claim 12, wherein the at least one pump is configured and arranged to distribute a liquid coolant from the electric machine module to the at least one remote module to at least partially cool the at least one remote module.

14. A method of cooling an electric machine module for a vehicle, the method comprising:
    providing a housing comprising a sleeve member, the housing defining a machine cavity;
    positioning an electric machine within the machine cavity so that the electric machine is at least partially enclosed by the housing and the sleeve member, the electric machine comprising a rotor and a stator assembly, the stator assembly circumscribing at least a portion of the rotor;
    coupling an output shaft to the rotor;
    positioning and dimensioning a coolant jacket to circumscribe at least a portion of the stator assembly, wherein the sleeve member forms at least one side of the coolant jacket; and wherein the coolant jacket is configured and arranged to house a liquid coolant;
    providing at least one pump fluidly coupled to the coolant jacket, and configured and arranged to be fluidly coupled to at least one component external to the electric machine module;
    positioning the at least one pump to be mounted generally concentrically with respect to the output shaft, the at least one pump in fluid communication with the coolant jacket;
    providing a volume of coolant, the volume sufficient to prime the at least one pump, and wherein the liquid coolant is coupled to the machine cavity, the pump and the coolant jacket; and
    circulating liquid coolant between the coolant jacket, the rotor, the stator assembly, and at least one other component of the electric machine and at least one other remote module which is coupled to other elements of the vehicle of external to the electric machine.

15. A method of cooling an electric machine module of claim 14, the method further comprising providing rotational torque to the rotor.

* * * * *